(12) United States Patent
Lin

(10) Patent No.: US 8,056,682 B2
(45) Date of Patent: Nov. 15, 2011

(54) BICYCLE BRAKE DEVICE

(76) Inventor: Chang Hui Lin, Chang Hua Hsien (TW)

( * ) Notice: Subject to any disclaimer, the term of this patent is extended or adjusted under 35 U.S.C. 154(b) by 1135 days.

(21) Appl. No.: 11/890,934

(22) Filed: Aug. 6, 2007

(65) Prior Publication Data

US 2009/0038893 A1    Feb. 12, 2009

(51) Int. Cl.
*B62L 1/02* (2006.01)
(52) U.S. Cl. .................. 188/24.12; 188/24.22
(58) Field of Classification Search .......... 188/24.11, 188/24.12, 24.21, 24.22
See application file for complete search history.

(56) References Cited

U.S. PATENT DOCUMENTS

| | | | | |
|---|---|---|---|---|
| 4,805,742 A * | 2/1989 | Sato | ............... | 188/24.11 |
| 5,103,938 A | 4/1992 | Yoshigai | ............... | 188/24.22 |
| 5,215,167 A | 6/1993 | Davidson | ............... | 188/24.19 |
| 5,636,716 A | 6/1997 | Sugimoto et al. | ............... | 188/24.22 |
| 5,791,671 A | 8/1998 | Tang et al. | ............... | 280/264 |
| 2006/0272903 A1 * | 12/2006 | Watarai | ............... | 188/24.11 |

FOREIGN PATENT DOCUMENTS

GB    989562 A  *  4/1965

* cited by examiner

*Primary Examiner* — Robert Siconolfi
*Assistant Examiner* — Vu Q Nguyen
(74) *Attorney, Agent, or Firm* — Charles E. Baxley

(57) ABSTRACT

A bicycle brake device includes a holder arm having a pivot shaft for attaching to a rear fork, two brake caliper having middle portions pivotally attached to the end portions of the holder arm, and having brake shoes attached to the lower portions, and a brake cable for selectively forcing the lower portions of the brake calipers and the brake shoes toward each other, the brake calipers may be balanced for effectively forcing the brake shoes to solidly clamp the wheel rim, and a spring biasing device may bias the brake shoes away from each other when the brake cable is released. A coupling device may couple the middle portions of the brake calipers together.

12 Claims, 9 Drawing Sheets

BICYCLE BRAKE DEVICE

BACKGROUND OF THE INVENTION

1. Field of the Invention

The present invention relates to a bicycle brake device, and more particularly to a bicycle brake device including a balanced structure for effectively engaging the brake shoes with the wheel rim and for solidly clamping the wheel rim and thus for solidly braking the bicycle wheel.

2. Description of the Prior Art

Typical bicycle brake devices comprise a pair of right and left cantilevers pivotally attached or mounted on the mounting brackets or rear forks, two brake shoes attached or mounted on the right and left cantilevers for engaging with the wheel rim, and a brake wire coupled to the right and left cantilevers for selectively forcing the brake shoes to engage with the wheel rim and to brake the bicycle wheel.

For example, U.S. Pat. No. 5,103,938 to Yoshigai discloses one of the typical cantilever brakes for two wheeled vehicles with separate stem and pivot shaft joined by a mounting bracket, and comprising an arch wire coupled to the right and left cantilevers, and coupled to the brake wire which may actuate the right and left cantilevers to force the brake shoes to engage with the wheel rim and to brake the bicycle wheel.

However, the right and left cantilevers are required to be indirectly coupled to the brake wire with the arch wire and a hanger, and the right and left cantilevers may not be solidly actuated to force the brake shoes to engage with the wheel rim and to brake the bicycle wheel.

U.S. Pat. No. 5,215,167 to Davidson discloses another typical adjustable bicycle brake cable control for cantilevered brake system and comprising a cable yoke coupled to the right and left lever arms, and coupled to the flexible stainless steel cable which may actuate or operate the right and left lever arms to force the brake shoes to engage with the wheel rim and to brake the bicycle wheel.

However, the right and left lever arms are required to be indirectly coupled to the flexible stainless steel cable with the cable yoke and two elongated rigid rods, and the right and left lever arms may not be solidly actuated with the cable yoke and the elongated rigid rods to force the brake shoes to engage with the wheel rim and to brake the bicycle wheel.

U.S. Pat. No. 5,636,716 to Sugimoto et al. discloses a further typical bicycle brake device comprising two brake arms pivotally attached to the attachment component, a linking arm rotatably linked to one of the brake arms and contacted with an outer cable of a brake cable, and the brake cable is linked to the other brake arm for forcing the brake shoes to engage with the wheel rim and to brake the bicycle wheel.

However, the typical bicycle brake device includes a complicated structure that may not be easily assembled or attached or mounted on the attachment component and/or the suspension component of the bicycle.

U.S. Pat. No. 5,791,671 to Tang et al. discloses a still further typical bicycle brake device comprising a preloading and cable routing assembly and a rotatable brake cable coupling system, and including a pair of brake calipers pivotally attached to the wheel fork, and a tubular sheath section coupled to one of the brake calipers with an adjustment nut, and a cable core element coupled to the other brake caliper.

However, the brake calipers may not be solidly actuated to force the brake shoes to engage with the wheel rim and to brake the bicycle wheel.

The present invention has arisen to mitigate and/or obviate the afore-described disadvantages of the conventional bicycle brake devices.

SUMMARY OF THE INVENTION

The primary objective of the present invention is to provide a bicycle brake device including a balanced structure for effectively engaging the brake shoes with the wheel rim and for solidly clamping the wheel rim and thus for solidly braking the bicycle wheel.

In accordance with one aspect of the invention, there is provided a bicycle brake device comprising a holder arm including a pivot shaft extended therefrom, and including a first end portion and a second end portion, a first brake caliper including a middle portion pivotally attached to the first end portion of the holder arm, and including a lower portion for attaching a brake shoe thereto, and including an upper portion, a second brake caliper including a middle portion pivotally attached to the second end portion of the holder arm, and including a lower portion for attaching a brake shoe thereto, and including an upper portion, an outer tube engaged with the upper portion of the first brake caliper, a brake cable engaged through the outer tube and coupled to the upper portion of the second brake caliper for selectively forcing the upper portions of the first and the second brake calipers toward each other, and a spring biasing device for biasing the lower portions of the first and the second brake calipers and the brake shoes away from each other when the brake cable is released.

The outer tube is preferably attached to the upper portion of the first brake caliper with an adjustment nut. The brake cable includes a termination fitting attached thereto for adjustably securing the upper portion of the second brake caliper to the brake cable with a fastener.

A coupling device may further be provided for coupling the middle portions of the first and the second brake calipers together. The coupling device includes an oblong hole formed in the middle portion of the second brake caliper, and an anchor member extended from the first brake caliper and slidably engaged in the oblong hole of the second brake caliper for coupling the middle portions of the first and the second brake calipers together and for limiting the middle portions of the first and the second brake calipers to slide relative to each other.

The holder arm includes a projection extended therefrom, the biasing device includes a spring biasing member having a ring member for engaging with the projection and for pivotally attaching or anchoring or mounting the spring biasing member on the holder arm.

The holder arm includes a depression formed therein for receiving the ring member of the spring biasing member. The spring biasing member includes two legs engaged with the lower portions of the first and the second brake calipers for selectively biasing and moving the brake shoes away from each other when the brake cable is released.

The first brake caliper includes a notch formed in the middle portion of the first brake caliper for pivotally receiving the first end portion of the holder arm. The first brake caliper includes an ear extended from the middle portion of the first brake caliper for forming the notch of the first brake caliper.

The first brake caliper includes a pivot pin engaged through the first end portion of the holder arm and the ear and the first brake caliper for pivotally coupling the middle portion of the first brake caliper to the holder arm.

The second brake caliper includes a notch formed in the middle portion of the second brake caliper for pivotally receiving the second end portion of the holder arm. The second brake caliper includes an ear extended from the middle portion of the second brake caliper and extended into the notch of the second brake caliper for forming or defining the notch of the second brake caliper.

The second brake caliper includes a pivot pin engaged through the second end portion of the holder arm and the ear and the second brake caliper for pivotally coupling the middle portion of the second brake caliper to the holder arm.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
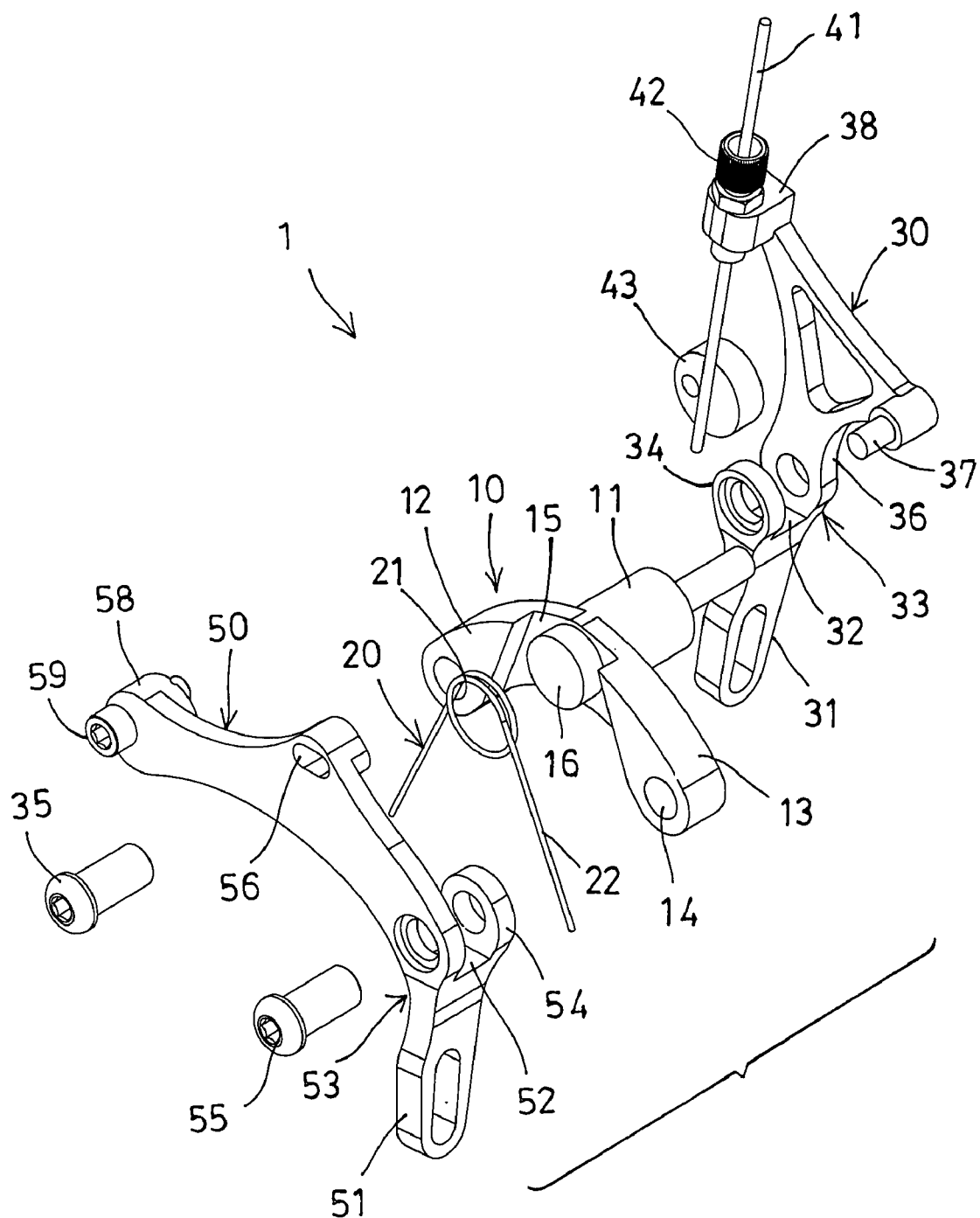
FIG. 1 is a partial exploded view of a bicycle brake device in accordance with the present invention.

Referring to the drawings, and initially to FIGS. 1-5, a bicycle brake device 1 in accordance with the present invention comprises a holder arm 10 including a middle pivot shaft 11 extended therefrom, such as extended rearwardly from the middle portion thereof for pivotally or rotatably attaching or mounting on the mounting brackets or the rear fork of a bicycle (not shown) with such as latches or fasteners (not shown) for allowing the holder arm 10 to be pivoted or rotated relative to the rear fork of the bicycle, the holder arm 10 includes two end portions 12, 13 provided on two sides of the shaft 11 and each having an orifice 14 formed therein, and includes a depression 15 formed in the front portion thereof and opposite to the shaft 11, and includes a projection 16 extended into the depression 15 thereof for attaching or mounting or engaging with a spring biasing means or member 20.

The spring biasing means or member 20 includes a middle or intermediate ring member 21 for engaging into the depression 15 of the holder arm 10 and for engaging with the projection 16 and thus for pivotally or rotatably attaching or mounting the spring biasing member 20 on the holder arm 10, and includes two limbs or legs 22. A first brake caliper 30 includes a lower portion 31 for attaching or mounting a brake shoe 88 thereto, and includes a notch 32 formed in the middle portion 33 thereof for pivotally or rotatably receiving or attaching or mounting one of the end portions 12 of the holder arm 10, and includes an ear 34 extended from the middle portion 33 of the first brake caliper 30 or extended into the notch 32 of the first brake caliper 30 for forming or defining the notch 32 between the first brake caliper 30 and the ear 34 and for stably receiving or anchoring or positioning the one end portion 12 of the holder arm 10 to the first brake caliper 30.

Figure 2:
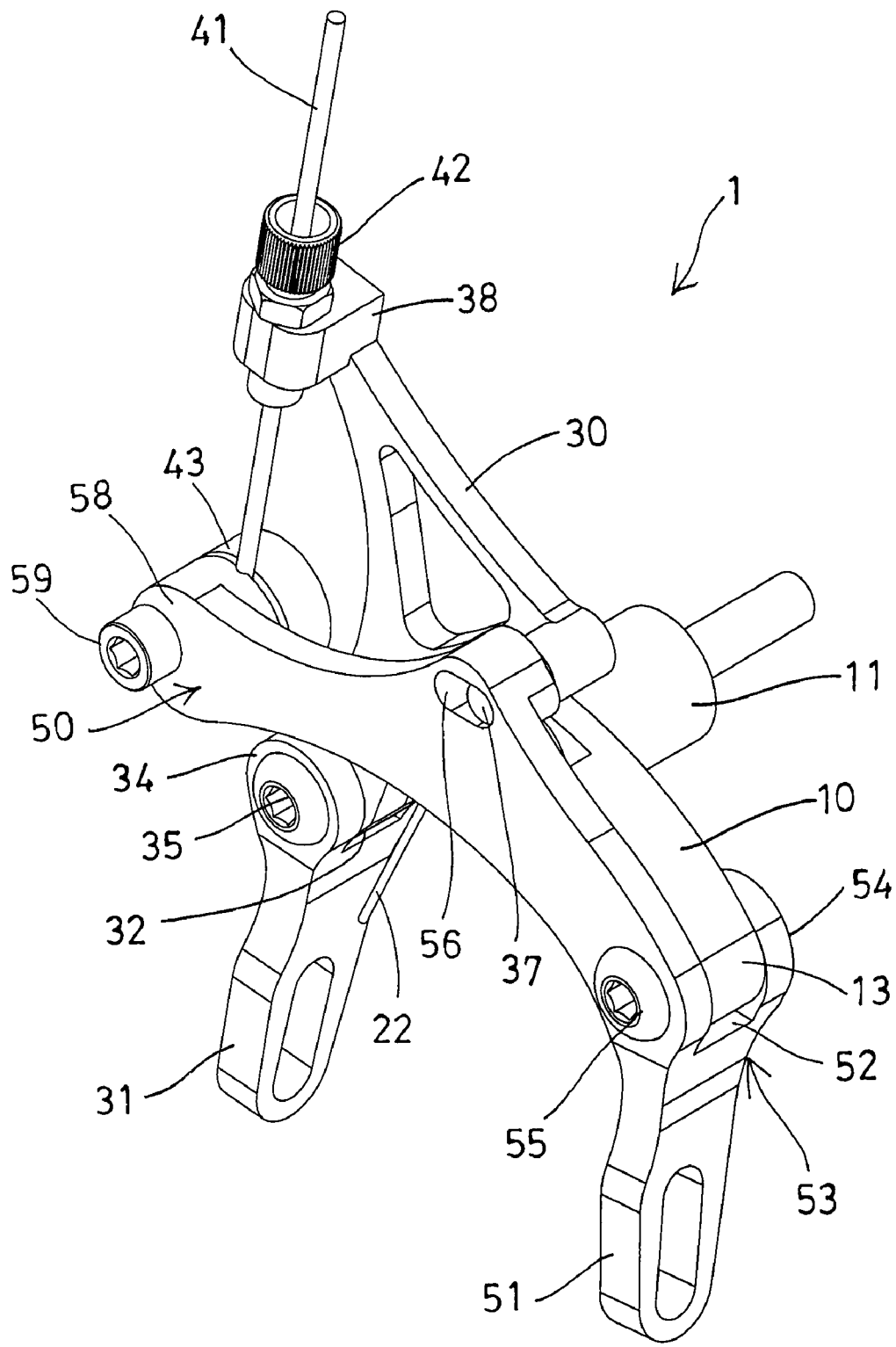
FIG. 2 is a perspective view of the bicycle brake device.
Figure 3:
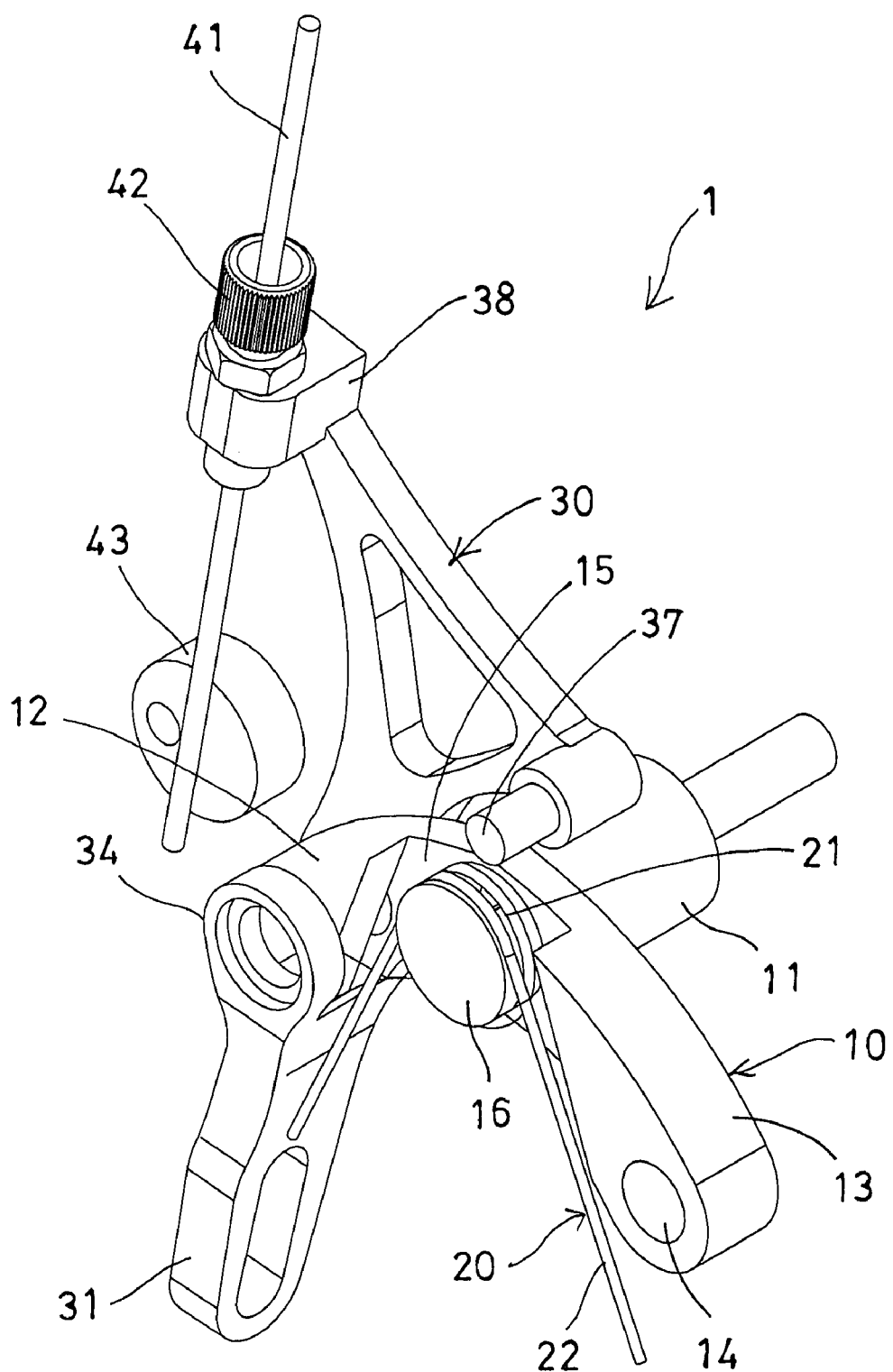
FIG. 3 is a partial perspective view of the bicycle brake device.

A pivot pin 35 is engaged through the one end portion 12 of the holder arm 10 and the ear 34 and the first brake caliper 30 for pivotally or rotatably attaching or mounting or coupling the middle portion 33 of the first brake caliper 30 to the holder arm 10. The first brake caliper 30 further includes a curved recess 36 formed in the middle portion 33 thereof for pivotally or rotatably engaging with the shaft 11 of the holder arm 10 and for allowing the first brake caliper 30 to be pivoted or rotated relative to the holder arm 10, and includes an anchor member 37 extended from the middle portion 33 of the first brake caliper 30 and perpendicular to the first brake caliper 30, and includes an upper portion 38 for attaching or mounting or securing an outer tube 40 (FIG. 4) of a brake cable 41 with an adjustment nut 42, in which the brake cable 41 is engaged through the outer tube 40, and a clamp or termination fitting 43 attached or secured to the end portion of the brake cable 41 (FIGS. 1, 2).

A second brake caliper 50 also includes a lower portion 51 for attaching or mounting a brake shoe 88 thereto, and includes a notch 52 formed in the middle portion 53 thereof for pivotally or rotatably receiving or attaching or mounting the other end portion 13 of the holder arm 10, and also includes an ear 54 extended from the middle portion 53 of the second brake caliper 50 for forming or defining the notch 52 between the second brake caliper 50 and the ear 54 and for stably receiving or anchoring the other end portion 14 of the holder arm 10. Another pivot pin 55 is engaged through the other end portion 13 of the holder arm 10 and the ear 54 and the second brake caliper 50 for pivotally or rotatably attaching or mounting or coupling the middle portion 53 of the second brake caliper 50 to the holder arm 10.

The second brake caliper 50 includes an oblong hole 56 formed in the middle portion 53 thereof for slidably receiving the anchor member 37 of the first brake caliper 30 and for slidably coupling the brake calipers 30, 50 together and for limiting the brake calipers 30, 50 to move relative to each other, and the anchor member 37 of the first brake caliper 30 and the oblong hole 56 of the second brake caliper 50 may be formed and acted as a coupling means or device for coupling the middle portions 33, 53 of the brake calipers 30, 50 together. The second brake caliper 50 includes an upper portion 58 for attaching or mounting to the brake cable 41 with the clamp or termination fitting 43 and a fastener 59 or the like, and thus for allowing the upper portions 38, 58 of the brake calipers 30, 50 to be selectively forced or moved toward each other with the brake cable 41, and thus for allowing the lower portions 31, 51 and the brake shoes 88 to be forced or moved toward each other to engage with the wheel rim (not shown) and to brake the bicycle wheel (not shown).

It is to be noted that the holder arm 10 may be solidly and pivotally or rotatably attached or mounted on the mounting brackets or the rear fork of the bicycle (not shown) with the shaft 11, and the middle portions 33, 53 of the brake calipers 30, 50 may also be solidly and pivotally or rotatably attached or mounted on the holder arm 10 such that the upper portions 38, 58 of the brake calipers 30, 50 may be solidly and effectively forced or moved toward each other with the brake cable 41, and such that the lower portions 31, 51 of the brake calipers 30, 50 and the brake shoes 88 may also be solidly and effectively forced or moved toward each other to engage with the wheel rim and to brake the bicycle wheel, and such that the bicycle brake device in accordance with the present invention may include a balanced structure for effectively engaging the brake shoes 88 with the wheel rim and for solidly clamping the wheel rim and thus for solidly braking the bicycle wheel.

Figure 4:
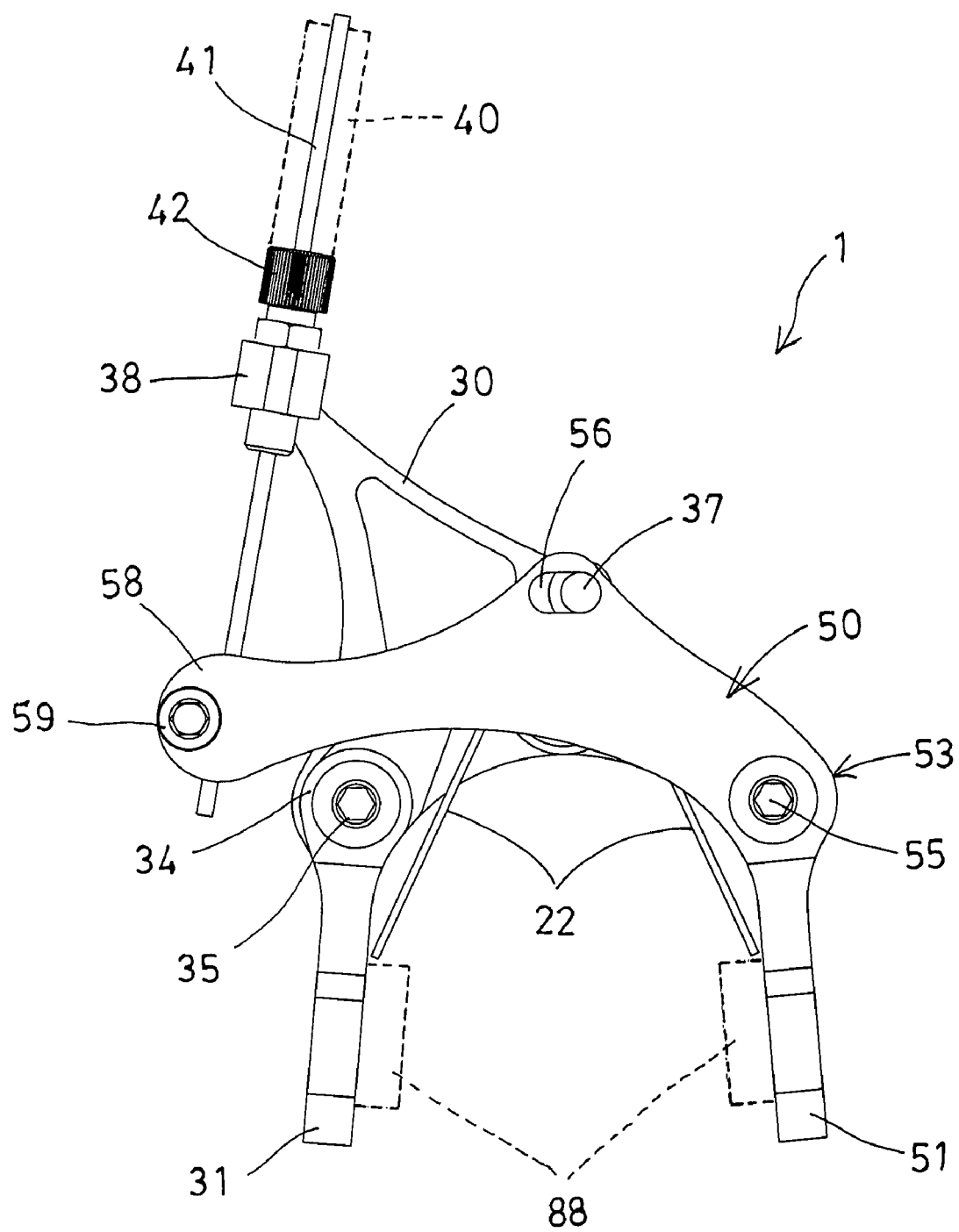
FIG. 4 is a front plan schematic view of the bicycle brake device.
Figure 5:
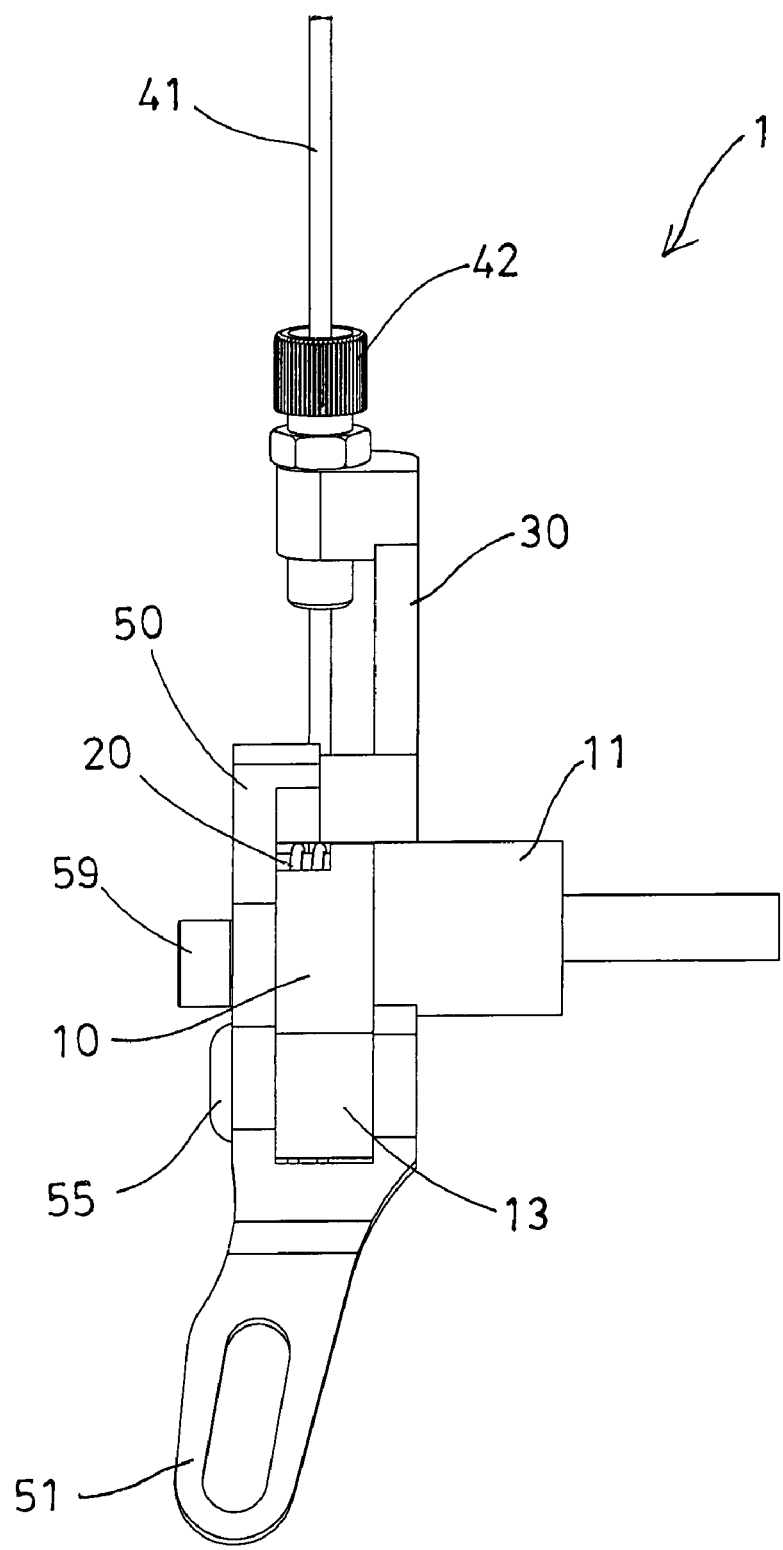
FIG. 5 is a side plan schematic view of the bicycle brake device.
Figure 6:
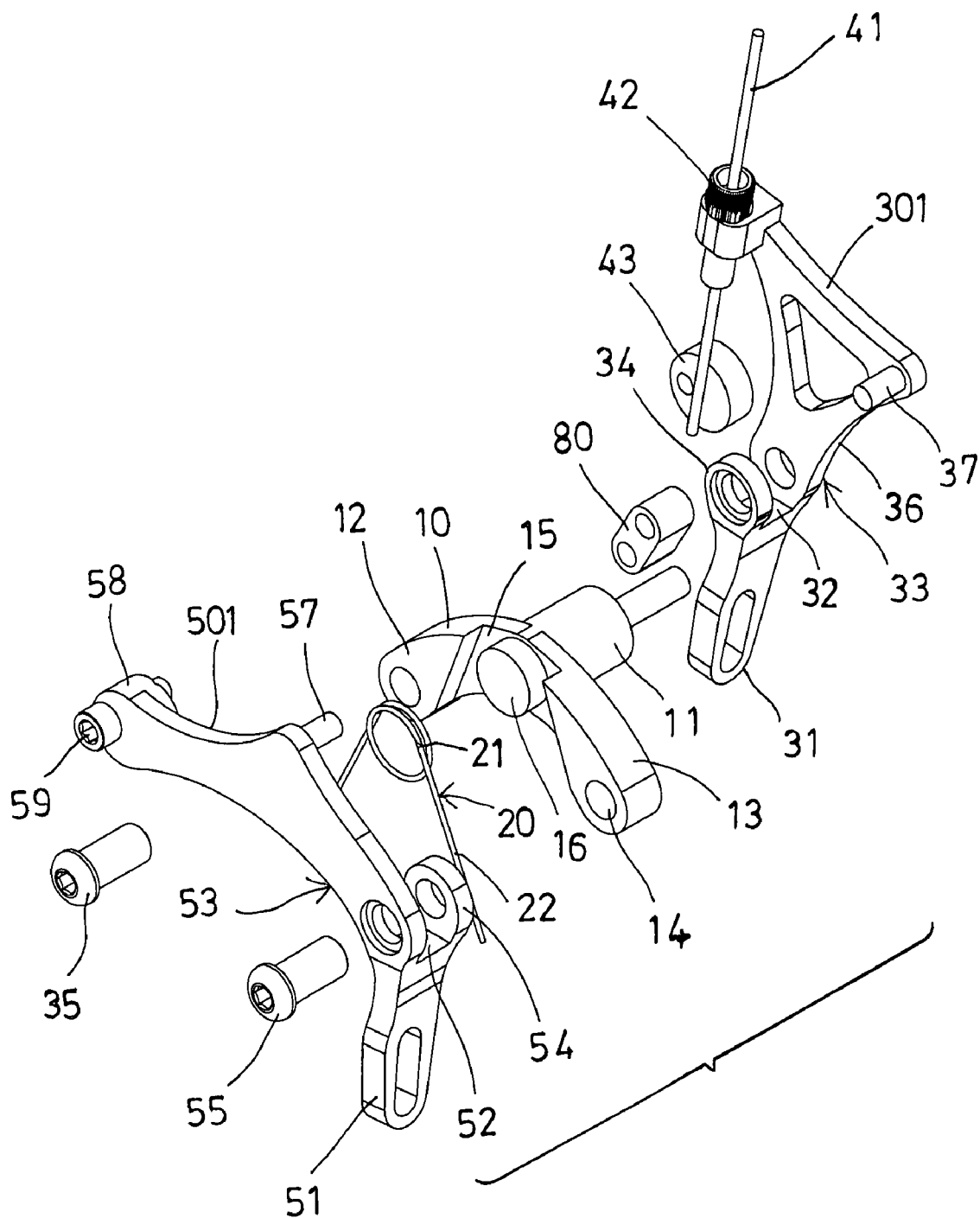
FIG. 6 is a partial exploded view similar to FIG. 1, illustrating the other arrangement of the bicycle brake device.
Figure 7:
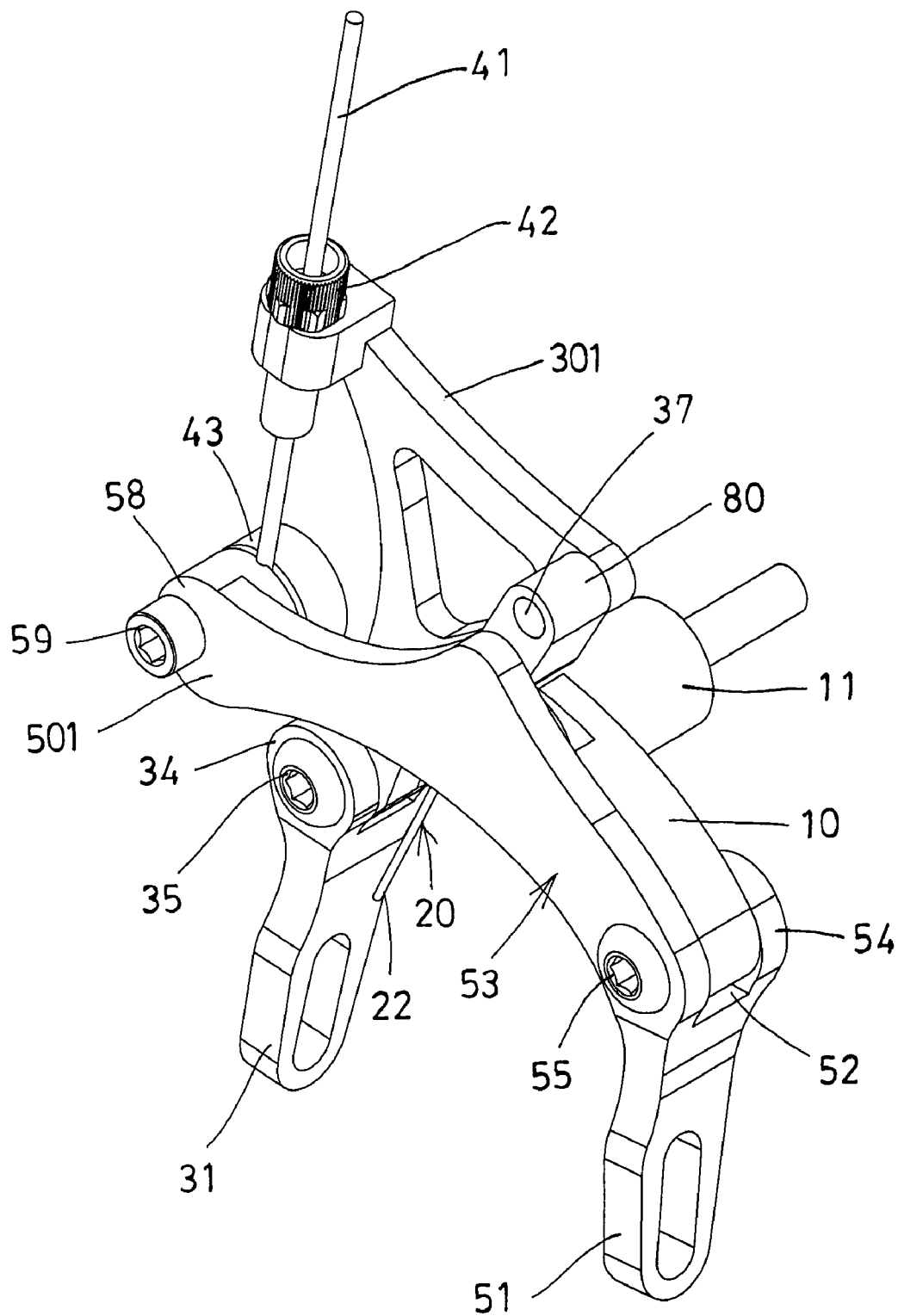
FIG. 7 is a perspective view of the bicycle brake device as shown in FIG. 6.
Figure 8:
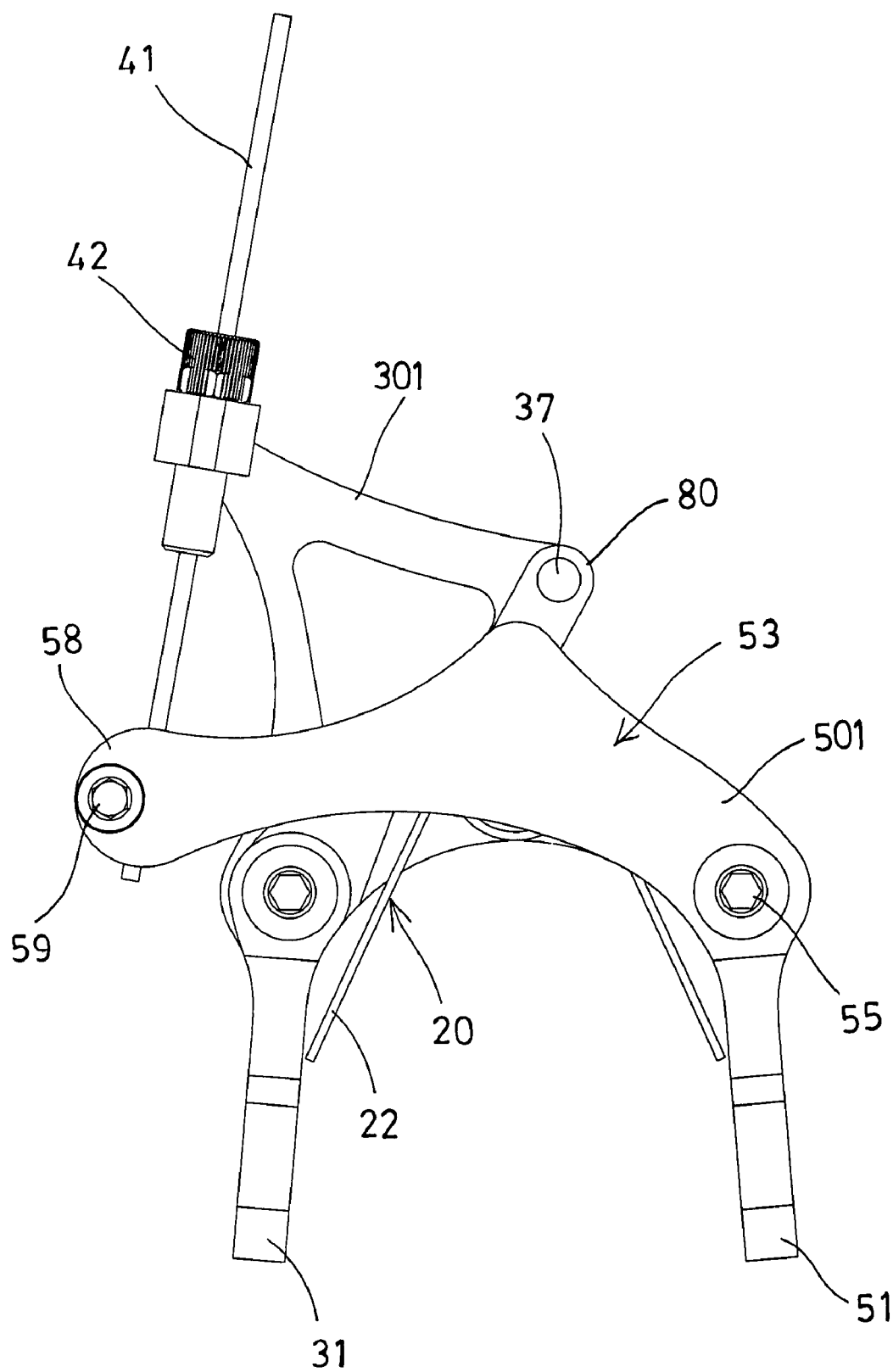
FIG. 8 is a front plan schematic view of the bicycle brake device as shown in FIGS. 6-7.
Figure 9:
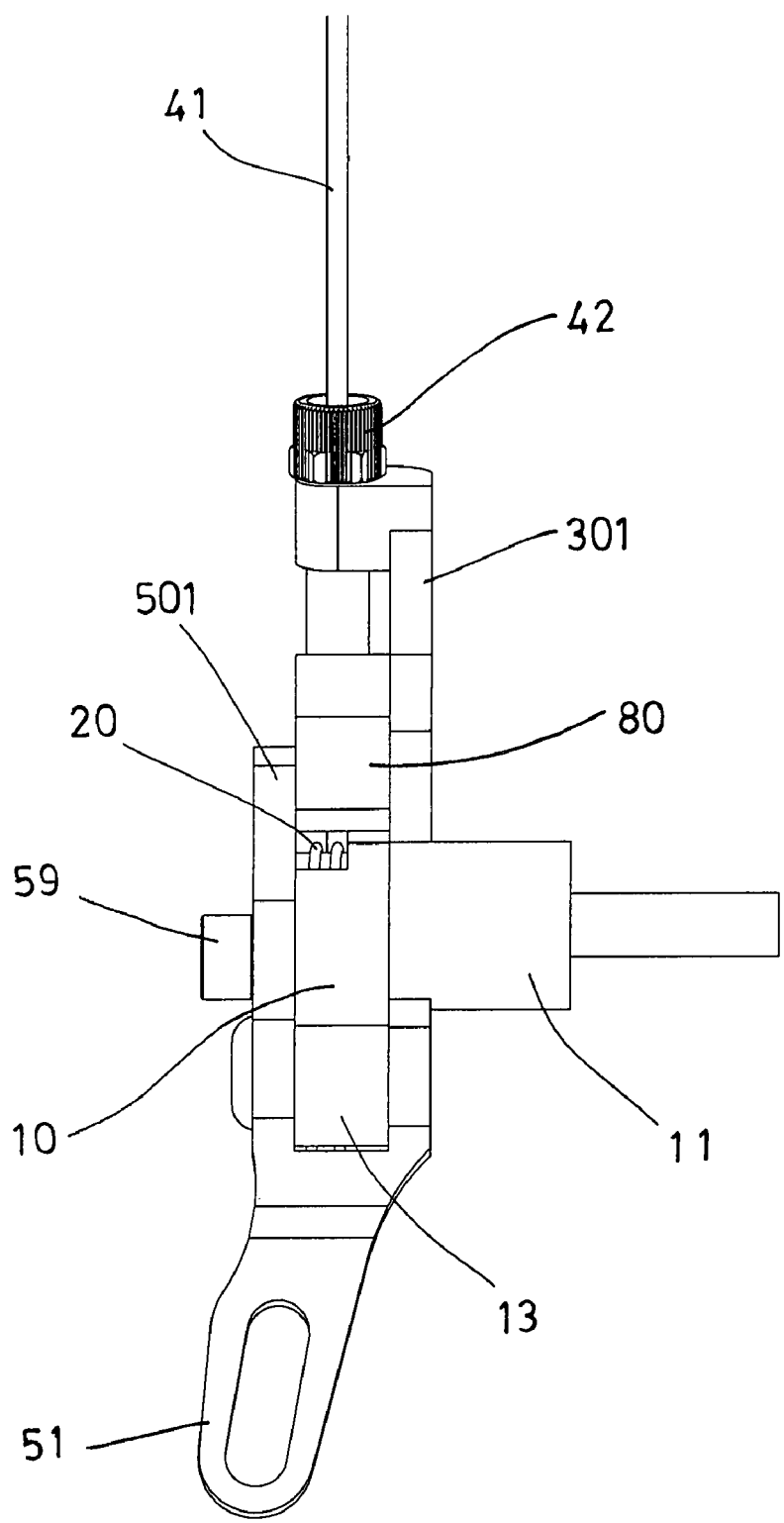
FIG. 9 is a side plan schematic view of the bicycle brake device as shown in FIGS. 6-8.

In operation, as shown in FIGS. 2 and 4, due to the solid attachment of the shaft 11 of the holder arm 10 to the mounting brackets or the rear fork of the bicycle, the upper portions 38, 58 of the brake calipers 30, 50 may be solidly and effectively forced or moved toward each other with the brake cable 41, and the lower portions 31, 51 of the brake calipers 30, 50 and the brake shoes 88 may be solidly and effectively forced or moved toward each other to engage with the wheel rim and to brake the bicycle wheel. The sliding engagement of the anchor member 37 of the first brake caliper 30 in the oblong hole 56 of the second brake caliper 50 allows the middle portions 33, 53 of the brake calipers 30, 50 to be slightly moved relative to each other and may limit the brake calipers 30, 50 to move relative to each other. The legs 22 of the spring biasing member 20 may be engaged with the lower portions 31, 51 of the brake calipers 30, 50 for selectively biasing and moving the brake shoes 88 away from the wheel rim of the bicycle wheel when the brake cable 41 is released.

Alternatively, as shown in FIGS. 6-9, an anchor member 37 may also be extended from the middle portion 33 of the first brake caliper 301 and perpendicular to the first brake caliper 301, and the second brake caliper 501 may include another anchor member 57 extended from the middle portion 53 of the second brake caliper 501 and perpendicular to the second brake caliper 501, and a linking member 80 may further be provided and engaged with or coupled to the anchor members 37, 57 of the brake calipers 301, 501 for pivotally coupling the middle portions 33, 53 of the brake calipers 301, 501 together and for limiting the brake calipers 301, 501 to move relative to each other.

Accordingly, the bicycle brake device in accordance with the present invention includes a balanced structure for effectively engaging the brake shoes with the wheel rim and for solidly clamping the wheel rim and thus for solidly braking the bicycle wheel.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bicycle brake device comprising:
   a holder arm including a pivot shaft extended therefrom, and including a first end portion and a second end portion,
   a first brake caliper including a middle portion pivotally attached to said first end portion of said holder arm, and including a lower portion for attaching a brake shoe thereto, and including an upper portion, said first brake caliper including a notch formed in said middle portion of said first brake caliper for pivotally receiving said first end portion of said holder arm, and said first brake caliper including an ear extended from said middle portion of said first brake caliper for forming said notch of said first brake caliper,
   a second brake caliper including a middle portion pivotally attached to said second end portion of said holder arm, and including a lower portion for attaching a brake shoe thereto, and including an upper portion,
   an outer tube engaged with said upper portion of said first brake caliper,
   a brake cable engaged through said outer tube and coupled to said upper portion of said second brake caliper for selectively forcing said upper portions and said lower portions of said first and said second brake calipers and said brake shoes toward each other, and
   means for biasing said lower portions of said first and said second brake calipers and said brake shoes away from each other when said brake cable is released.

2. The bicycle brake device as claimed in claim 1, wherein said outer tube is attached to said upper portion of said first brake caliper with an adjustment nut.

3. The bicycle brake device as claimed in claim 1 further comprising means for coupling said middle portions of said first and said second brake calipers together.

4. The bicycle brake device as claimed in claim 3, wherein said coupling means includes a first anchor member extended from said middle portion of said second brake caliper, and a second anchor member extended from said first brake caliper, and a linking member coupled to said first and said second anchor members for coupling said middle portions of said first and said second brake calipers together.

5. The bicycle brake device as claimed in claim 1, wherein said holder arm includes a projection extended therefrom, said biasing means includes a spring biasing member having a ring member for engaging with said projection and for pivotally attaching said spring biasing member on said holder arm.

6. The bicycle brake device as claimed in claim 5, wherein said holder arm includes a depression formed therein for receiving said ring member of said spring biasing member.

7. The bicycle brake device as claimed in claim 5, wherein said spring biasing member includes two legs engaged with said lower portions of said first and said second brake calipers for selectively biasing said brake shoes away from each other when said brake cable is released.

8. The bicycle brake device as claimed in claim 1, wherein said first brake caliper includes a pivot pin engaged through said first end portion of said holder arm and said ear and said first brake caliper for pivotally coupling said middle portion of said first brake caliper to said holder arm.

9. The bicycle brake device as claimed in claim 1, wherein said second brake caliper includes a notch formed in said middle portion of said second brake caliper for pivotally receiving said second end portion of said holder arm.

10. The bicycle brake device as claimed in claim 1, wherein said brake cable includes a termination fitting attached thereto for securing said upper portion of said second brake caliper to said brake cable with a fastener.

11. A bicycle brake device comprising:
   a holder arm including a pivot shaft extended therefrom, and including a first end portion and a second end portion,
   a first brake caliper including a middle portion pivotally attached to said first end portion of said holder arm, and including a lower portion for attaching a brake shoe thereto, and including an upper portion,
   a second brake caliper including a middle portion pivotally attached to said second end portion of said holder arm, and including a lower portion for attaching a brake shoe thereto, and including an upper portion, said second brake caliper including a notch formed in said middle portion of said second brake caliper for pivotally receiving said second end portion of said holder arm, said second brake caliper including an ear extended from said middle portion of said second brake caliper for forming said notch of said second brake caliper,
   an outer tube engaged with said upper portion of said first brake caliper,
   a brake cable engaged through said outer tube and coupled to said upper portion of said second brake caliper for selectively forcing said upper portions and said lower portions of said first and said second brake calipers and said brake shoes toward each other, and means for biasing said lower portions of said first and said second brake calipers and said brake shoes away from each other when said brake cable is released.

12. The bicycle brake device as claimed in claim 11, wherein said second brake caliper includes a pivot pin engaged through said second end portion of said holder arm and said ear and said second brake caliper for pivotally coupling said middle portion of said second brake caliper to said holder arm.

* * * * *